United States Patent [19]

McCoy

[11] 4,426,106
[45] Jan. 17, 1984

[54] PIPE COUPLING

[76] Inventor: James B. McCoy, 308 Winterbrook, Olathe, Kans. 66061

[21] Appl. No.: 284,210

[22] Filed: Jul. 17, 1981

[51] Int. Cl.³ ............................................. F16L 21/08
[52] U.S. Cl. .................................... 285/236; 285/369; 285/383; 285/423; 285/DIG. 22
[58] Field of Search ............... 285/235, 236, DIG. 22, 285/369, 373, 229, 259, 350, 349, 383, 423

[56] References Cited

U.S. PATENT DOCUMENTS 3,211,475  10/1965  Freed et al. .................... 285/236 X
4,214,586   7/1980  Mericle ....................... 285/DIG. 22

FOREIGN PATENT DOCUMENTS 981723  1/1976  Canada ............................... 285/236
558906  8/1973  Switzerland ....................... 285/236

*Primary Examiner*—Dave W. Arola
*Attorney, Agent, or Firm*—Kokjer, Kircher, Bradley, Wharton, Bowman & Johnson

[57] ABSTRACT

A pipe coupling for connecting pipes end to end in fluid tight fashion. A sleeve having open ends receives the end portions of the pipes. The sleeve has a pair of ribs on its inside surface which snap into mating grooves on the pipe ends when the pipe ends are fully inserted. A clamping band is tightened on the sleeve to squeeze it against the pipes and to deform the ribs such that they completely fill the grooves. A series of striations on the inside surface of the sleeve also seal against the pipes.

5 Claims, 3 Drawing Figures

PIPE COUPLING

BACKGROUND AND SUMMARY OF THE INVENTION

This invention relates in general to pipe couplings and, more particularly, to a pipe coupling which joins pipe ends together in fluid tight fashion.

In situations where pipes are used to handle corrosive or toxic fluids or other types of potentially dangerous fluids, it is highly important that the pipe sections be joined in a manner providing a leakproof seal at the joint. Otherwise, leakage at the pipe coupling can cause significant problems. It is also important that the pipe sections be held together firmly enough to prevent separation of the pipes or failure of the coupling due to the application of axial loads to the pipes.

Various types of pipe coupling devices are shown in U.S. Pat. No. 3,790,194 to Kimberley, U.S. Pat. No. 3,588,164 to Havell, U.S. Pat. No. 3,211,475 to Freed et al, and U.S. Pat. No. 4,101,151 to Ferguson. All of these proposed pipe couplings and other known couplings are lacking somewhat in their ability to effectively seal the pipe ends and also in their ability to hold the pipes against axial separation.

The present invention is directed to an improved pipe coupling and has, as its primary object, the provision of a pipe coupling which is constructed and arranged in a manner to firmly hold pipe ends together in fluid tight fashion.

In accordance with the invention, a sleeve which receives the ends of the pipes is provided on its inside surface with a series of striations and with a pair of larger ribs which fit closely in mating annular grooves formed in the pipes. A clamping band is applied to the sleeve to squeeze it inwardly against the pipe ends such that the striations seal against the pipes and the ribs fill the grooves to provide additional sealing. A flange located within the sleeve midway between the ribs abuts the pipe ends when the sleeve is fully applied to the pipes.

Each rib has a beveled surface which facilitates entry of the pipe ends into the sleeve. Opposite the beveled surface of each rib is a square shoulder which enters the mating groove in a snap fit to securely lock the sleeve on the pipe. Each groove is rectangular in section, and each rib deforms in a manner to completely fill the corresponding groove such that an effective seal results and the pipe sections are firmly held against axial separation.

DETAILED DESCRIPTION OF THE INVENTION

In the accompanying drawing which forms a part of the specification and is to be read in conjunction therewith and in which like reference numerals are used to indicate like parts in the various views.

Figure 1:
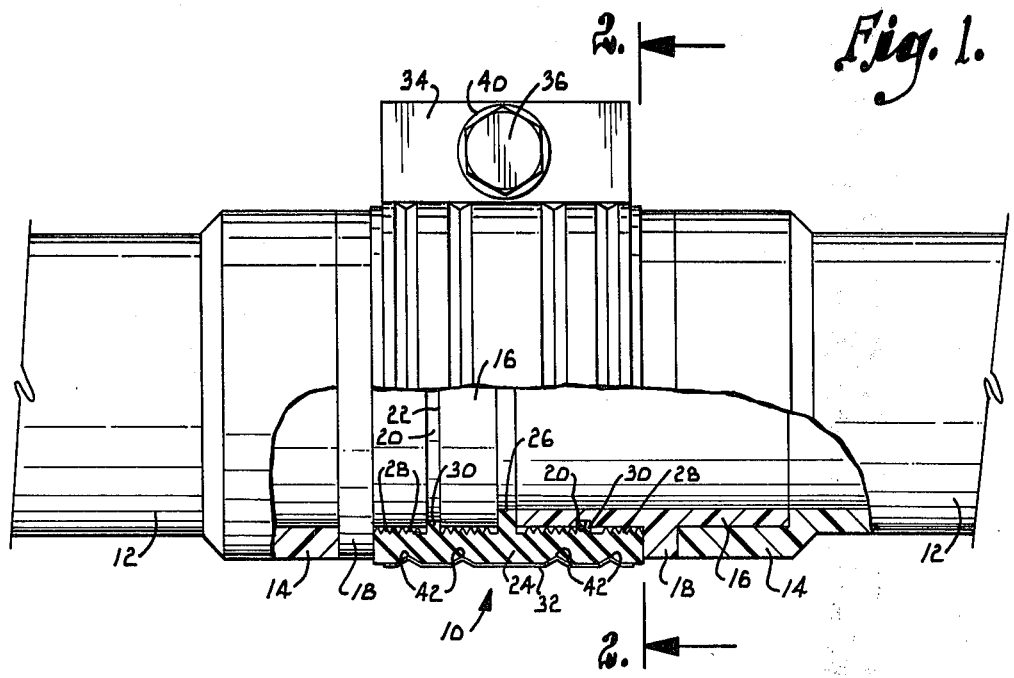
FIG. 1 is a fragmentary elevational view showing the ends of a pair of pipe sections joined together by a pipe coupling constructed according to a preferred embodiment of the present invention, with portions shown in section for illustrative purposes.

Referring now to the drawing in more detail, the present invention provides a pipe coupling 10 which is used to join a pair of pipes 12 end to end in leakproof fashion. The end of each pipe is flared at 14 to provide a bell mouth, and a short tube 16 is secured in the flared end 14 of each pipe to provide a continuous inside surface at the end portion of each pipe. A flange 18 is formed at the center of each tube 16 and abuts the end of the flared portion 14 of the pipe. An annular circumferential groove 20 is formed in the outside surface of each tube 16 beyond the flange 18. Each groove 20 is rectangular in cross section and includes a flat annular surface 22 facing away from the free end of tube 16 and oriented perpendicular to the pipe axis. In a preferred form of the invention, groove 20 is approximately 0.05 inch deep.

The pipes 12 are used to handle fluids which are potentially dangerous and for this reason it is important that they be joined together in a manner preventing leakage at the joint. Each pipe 12 and the end tube 16 forming a part thereof are preferably formed of the same material and may be rigid plastic or cast iron. Also, rather than being straight pipe sections as shown in the drawing, the pipes may be bent into elbows or any other shape.

The pipe coupling 10 includes a generally tubular sleeve 24 having a smooth, cylindrical outside surface and open ends. The sleeve 24 is formed of a material having adequate rigidity to support the connected pipes 12 and yet is deformable in compression to squeeze against the pipe ends when clamped thereto, as will be subsequently described. A plastic material such as ethylene vinyl acetate is particularly well suited, and it is thus preferred that the sleeve be constructed of this material, although other materials having suitable properties can be used.

An annular flange 26 projects from the inside surface of sleeve 24 at the center thereof. The flange 26 is integral with the body of sleeve 24 and is rectangular in section. The distance between each end of sleeve 24 and the closest side of the flange 26 is approximately equal to the distance between the end of tube 16 and the closest side of flange 18.

Figure 3:
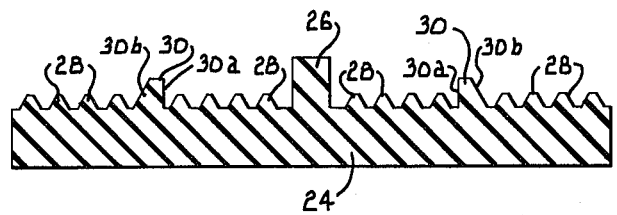
FIG. 3 is a fragmentary sectional view on an enlarged scale showing the pipe coupling sleeve separated from the pipes.

The inside surface of sleeve 24 is provided with a plurality of small annular ridges or striations 28 which are integral with the sleeve. As best shown in FIG. 3, the striations 28 are tapered as they extend inwardly from the inside surface of sleeve 24. Both sides of each striation are angled at approximately 30° with respect to a radius line of the sleeve. The tips of the striations are not pointed but are instead flat surfaces approximately 0.008–0.010 inch in width.

With continued reference to FIG. 3, the inside surface of sleeve 24 is provided with a pair of annular ribs 30 which are formed integrally with the sleeve at locations approximately midway between the central flange 26 and the opposite ends of the sleeve. The striations 28 extend from flange 26 to each rib 30 and from each rib 30 outwardly to the end of the sleeve. Each rib 30 has a flat annular shoulder 30a facing toward the central flange 26 and oriented perpendicular to the axis of the sleeve. Opposite the flat shoulder 30a, each rib has a beveled surface 30b giving each rib a tapered profile as it extends inwardly from the body of sleeve 24. The shoulders 30a and beveled surface 30b of each rib are connected by a flat annular surface 30c which, in a preferred embodiment of the invention, is located approximately 0.075 inch from the inside surface of the sleeve. Each rib 30 thus has a depth (0.075 inch) somewhat greater than that of the corresponding groove 20 (0.050 inch). However, due to the tapered shape of the ribs resulting from the beveled surfaces 30b, each rib 30 has substantially the same cross-sectional area as the corresponding groove 20.

Figure 2:
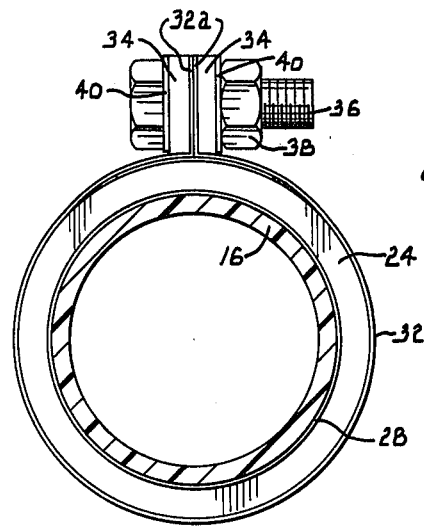
FIG. 2 is a sectional view taken generally along line 2—2 of FIG. 1 in the direction of the arrows.

The pipe coupling assembly includes a clamping band 32 which may be conveniently constructed of stainless steel or another metal. As shown in FIG. 2, the clamping band 32 has flat end portions 32a which are clamped between a pair of small metal plates 34. A bolt 36 is extended through both plates 34 and both of the ends 32a of the clamping band and is secured by a nut 38. Washers 40 are interposed between the bolt head and the adjacent plate 34 and between the nut and the adjacent plate.

The length of clamping band 32 between the end portions 32a is slightly less than the outside diameter of sleeve 24 in its undeformed condition. Thus, application of the clamping band to the sleeve and tightening of nut 38 on the bolt 36 squeezes sleeve 24 against the end portions of the pipes held by the coupling device. The width of clamping band 32 is slightly less than the length of sleeve 24. As shown in FIG. 1, the clamping band 32 is deformed inwardly to provide four internal ridges 42 extending completely around sleeve 24. The ridges 42 are arranged such that a pair of ridges is located on opposite sides of each of the ribs 30 in order to provide additional squeezing of the sleeve in the areas adjacent the opposite sides of the ribs.

In use, the pipe coupling 10 serves to connect pipes 12 in a fluid tight manner and without providing a flow disruption. The sleeve 24 receives the end portions of the pipes provided by tubes 16. The end portions of the pipes are inserted into the sleeve until the pipe end abuts the central flange 26 to limit the extent to which the pipe end can penetrate the sleeve. The beveled surfaces 30b facilitate insertion of the pipe ends and facilitate deformation of the ribs 30 as the pipe ends are being inserted into the sleeve.

When each pipe end is fully inserted into sleeve 24, shoulder 30a clears surface 22, and rib 30 enters groove 20 in a snap fit, with shoulder 30a engaging surface 22 to firmly hold the pipe and sleeve together. At this point, flange 26 abuts the end of each pipe, and flanges 18 engage the opposite ends of sleeve 24. The clamping band 32 is then applied to sleeve 24 and is tightened by tightening nut 38 on both 36. Tightening of the clamping band effects radial compression of sleeve 24 and squeezes it firmly against the outside surfaces of the pipe ends. The striations 28 are thus pressed tightly against the pipe ends to form a fluid tight seal. At the same time, the pipe ends are pressed against the central flange 26 to provide additional sealing. As shown in FIG. 1, flange 26 provides a continuous surface between the adjacent ends of the two pipes and thus achieves flow continuity.

The squeezing effect provided by clamping band 32 presses ribs 32 firmly into the corresponding grooves 20 and deforms the ribs such that they completely fill the grooves. Since the cross-sectional area of each rib 30 is approximately the same as that of the corresponding groove, the rib is able to completely fill the groove to increase the effectiveness of the seal formed at the pipe joint. The ridges 42 on clamping band 32 assist in holding ribs 30 in grooves 20 by providing additional squeezing on opposite sides of each rib.

It is thus apparent that the pipe coupling 10 connects pipes 12 in leakproof fashion. At the same time, the close fit of ribs 30 in grooves 20 and the engagement of shoulders 30a against surfaces 22 resist any tendency of the pipes to pull apart due to the application of axial tension loads. The flat peaks of striations 28 increase their ability to effectively seal against the outside surfaces of the pipe ends and cooperate with ribs 30 and flange 26 to provide a particularly effective seal against leakage of the corrosive or toxic fluids handled by the pipes.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. A pipe coupling arrangement for joining end portions of a pair of pipes, comprising:

means providing a circumferential groove in the exterior surface of the end portion of each pipe, each groove having a flat annular surface oriented generally perpendicular to the axis of the pipe and facing away from the end portion of the pipe;

a sleeve having open opposite ends for closely receiving the end portions of the respective pipes;

a plurality of circumferentially oriented striations on the inside surface of said sleeve engaging the pipe end portions inserted in the sleeve;

a pair of annular ribs on the inside surface of said sleeve located to fit in the respective circumferential grooves when the end portions of said pipes are fully inserted into the sleeve, each rib having a flat shoulder oriented perpendicular to the axis of the sleeve and engaged with said flat annular surface of the corresponding groove when the pipe end portions are fully inserted into the sleeve thereby preventing axial withdrawal of the pipes from the sleeve;

a beveled surface on each rib opposite the shoulder thereof to facilitate application of said sleeve to the pipe end portions;

each rib having a shape when undeformed different from the shape of the corresponding groove and each rib being deformable to substantially fill the corresponding groove in a manner to seal against the adjacent groove surfaces when the sleeve is squeezed against the pipe end portions; and means for clamping said sleeve onto the end portions of said pipes to squeeze the sleeve against the pipe end portions to maintain said ribs in the deformed condition in the corresponding grooves and to effect sealing engagement between said striations and the exterior surfaces of the pipes.

2. The invention of claim 1, wherein said clamping means comprises a clamping band and releaseable means for clamping said band tightly around said sleeve, said clamping band having a pair of internal ridges engaging said sleeve at locations on opposite sides of each of said ribs to assist in maintaining said ribs in the respective grooves.

3. The invention of claim 1, including an annular flange projecting from the inside surface of said sleeve at a location intermediate said ribs, said flange limiting the penetration of the pipe end portions into said sleeve and sealing against the end of each pipe when said ribs are fitted in the respective grooves.

4. The invention of claim 1, wherein:

each circumferential groove is substantially rectangular in cross section; and each rib has a greater depth in the undeformed condition than the depth of the corresponding groove, whereby each rib is squeezed to substantially fill the corresponding groove when the sleeve is squeezed.

5. The invention of claim 4, including a flat annular surface on each rib extending between the shoulder and beveled surface thereof to engage the bottom of the corresponding groove when received therein.

* * * * *